T. J. KING.
PLANTER AND SPREADER.
APPLICATION FILED OCT. 13, 1909. RENEWED OCT. 31, 1910.
977,884.
Patented Dec. 6, 1910.
3 SHEETS—SHEET 1.
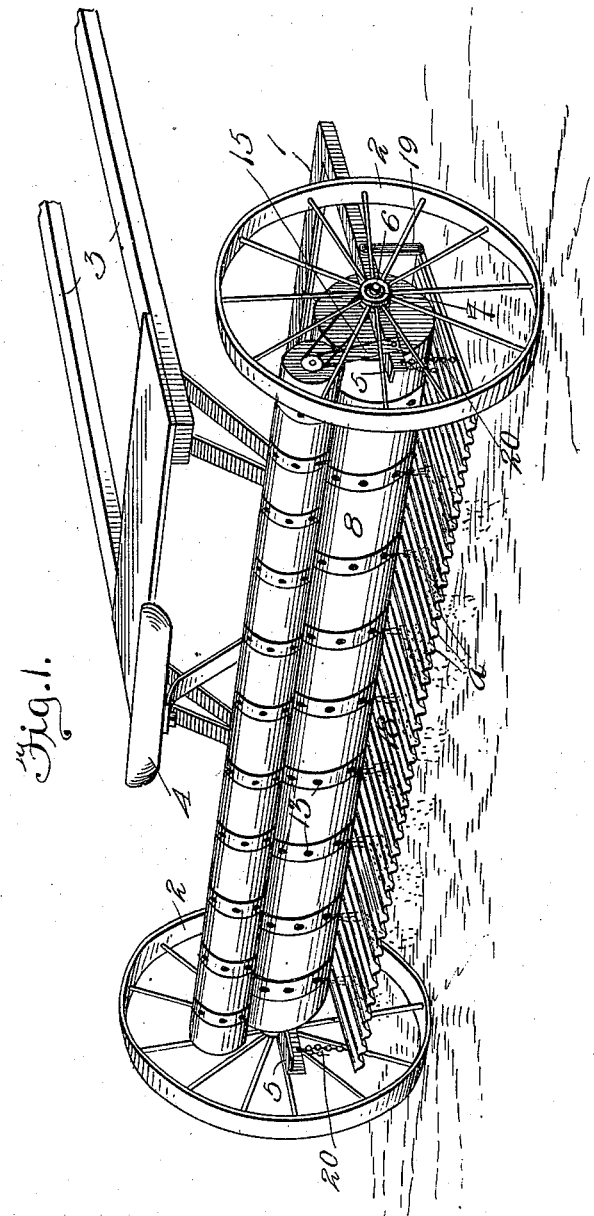
WITNESSES
G. M. Spring.
A. Clarke.
INVENTOR
Thomas J. King,
by David Moore
his Attorney

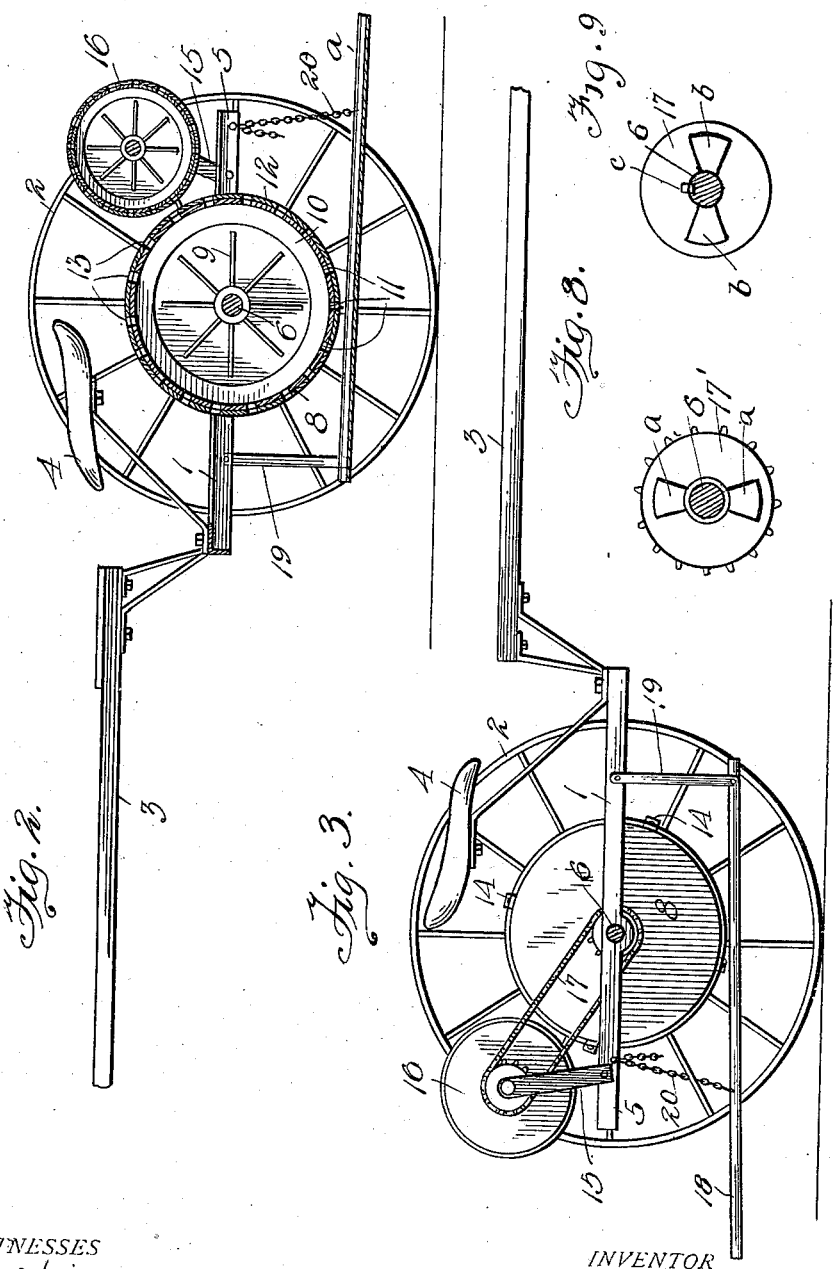

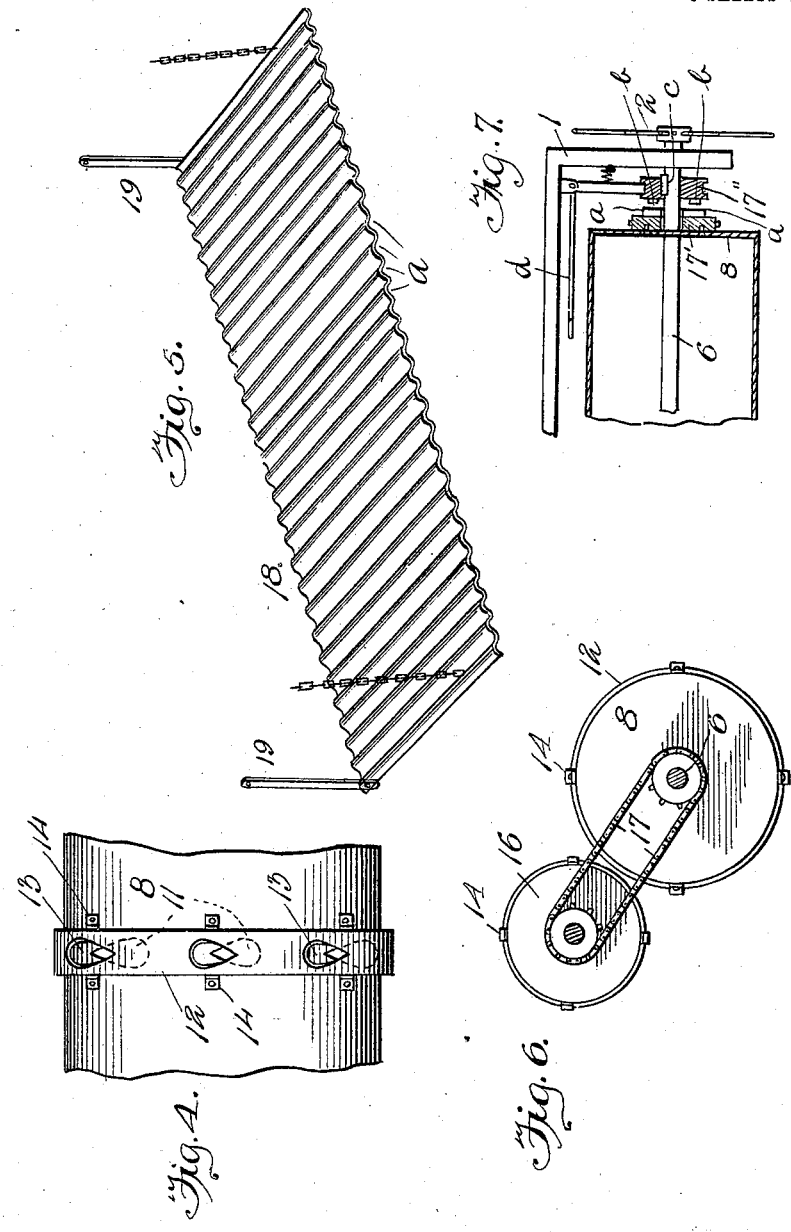

UNITED STATES PATENT OFFICE.

THOMAS JOEL KING, OF RICHMOND, VIRGINIA.

PLANTER AND SPREADER.

977,884.

Specification of Letters Patent. Patented Dec. 6, 1910.

Application filed October 13, 1909, Serial No. 522,378. Renewed October 31, 1910. Serial No. 589,952.

*To all whom it may concern:*

Be it known that I, THOMAS JOEL KING, a citizen of the United States, residing at Richmond, in the county of Henrico and State of Virginia, have invented certain new and useful Improvements in Planters and Spreaders, of which the following is a specification, reference being had therein to the accompanying drawing.

My present invention relates to an improved planter and spreader, that is a machine, which may be used either as a combined seed planter and lime and fertilizer spreader, or as either separately.

To accomplish the result desired, I employ a two wheeled vehicle, to whose frame is connected a tongue, or where light enough a pair of shafts, and mounted so as to rotate with the wheels is a cylinder or drum in which is placed the lime and fertilizer to be spread. This drum is provided with a series of rows of peripheral or circumferential openings, which are each further provided with means whereby the size of the opening may be regulated, for the feeding or dropping of the contents of the drum. As the vehicle is drawn, the wheels rotate and in turn rotate the drum, from whence the contents are dropped upon a sheet of corrugated metal, arranged transversely of the vehicle below the drum. This corrugated sheet inclines toward the rear and in this way feeds the lime and fertilizer evenly to the ground. The drum is provided with a series of internal annular circumferential rings or flanges, which provide circumferential compartments, one to each row of openings, this being provided will insure the feeding of the contents to the openings should the vehicle be operated upon a hill or uneven ground and also the flanges assist with the spokes of the drum in breaking up the large lumps of the contents. In order to plant seed simultaneously with the lime and fertilizer spreading operation, I employ a drum of similar construction journaled above and to the rear of the main drum, the seed drum being geared or chained to the wheels, so that it may be rotated and its contents dropped upon the corrugated sheet of metal or apron, from whence the seed fall to and upon the ground.

To more clearly understand the details of my invention and thoroughly appreciate the advantages thereof, attention is invited to the accompanying drawings, in which:—

Figure 1 is a perspective view of the complete machine. Fig. 2 is a transverse section through the lime and fertilizer drum, illustrating the mounting of the same and the interior construction thereof. Fig. 3 is a side elevation with one wheel removed. Fig. 4 is a detail view of the means for regulating the size of the openings of the drums. Fig. 5 is a detail view of the spreading apron, and Fig. 6 is a detail view of the seed drum operating mechanism. Fig. 7 is a detail section illustrating the locking and releasing device of the drums, said device being shown unlocked. Fig. 8 is a plan view of the sprocket member of the clutch, and Fig. 9 is a plan view of the opposed side of the slidable clutch member.

Referring to the drawings:—The numeral 1 designates the frame, mounted upon the two wheels 2, said frame carrying the tongue or shafts 3 and the driver's seat 4. This frame is U-shaped and is provided with the two rearward extending arms 5, the purpose of which will appear presently. Carried by and rotatable with the two wheels is an axle or shaft 6, which also carries the locking and releasing device (Figs. 7, 8 and 9), by means of which the cylindrical drum 8, may be made to either rotate with the wheels and shaft or permit the shaft to rotate freely within the drum. Upon the shaft within the drum and mounted at predetermined distances are the short spokes 9, which are adapted to rotate to break or crumble the lime within the drum. The locking and releasing device comprises the sprocket 17', which is made fast to the end of the drum 8, Fig. 7, and is provided with the two dove-tailed lugs $a$, which are adapted to be engaged by the dove-tailed lugs $b$ of the slidable clutch disk 17'', mounted upon the axle 6, the key $c$, permitting the sliding movement, but causing the disk to always rotate with the axle 6. By this means, a lever $d$ can be operated to throw in and out the clutch, to cause the drum 8 to remain either rotatable with the shaft or free therefrom.

Secured annularly within the drum to the cylindrical wall thereof and dividing the same into a series of peripheral pockets or compartments are the rims or flanges 10, and provided in the wall in a circumferential row, one row to each compartment, are the oval-shaped openings or apertures 11, through which the contents of the drum fall as the drum is rotated. To regulate the size of the openings or apertures, and thereby the quantity of lime and fertilizer fed therethrough, I provide the bands 12, which are slidably mounted as shown in Fig. 4, so that their openings or apertures 13 will uncover or expose the desired portion of the openings 11, these bands being prevented from transverse movement by means of the brackets or stops 14. It will thus be seen that the flanges or rims 10, insure the feeding of the lime and fertilizer to the respective compartments, so that an even feed is insured throughout the length of the drum, whether the machine be operated upon flat or hill-side ground, and by means of the regulating bands, the desired quantity is permitted to flow from the drum, as the drum is rotated.

Journaled in the auxiliary frame 15, which is mounted upon the rear of the main frame and above and slightly in the rear of the main drum 8 is a smaller cylindrical drum 16, which is similar in construction to the drum 8, and is for carrying seed, such as grass, clover and grain seed, which it is desired to sow broadcast. To rotate this drum, I employ the chain and sprocket 17, which receives power from the axle or shaft of the machine and thus is rotated when desired in unison with the main drum 8, thus providing a means whereby in addition to spreading lime and fertilizer broadcast, also spreads seed simultaneously.

In order to insure the even broad-casting of the lime and fertilizer, and also the seed, upon the ground, I employ the apron 18, which is preferably a corrugated sheet of iron, the corrugations a, running parallel with the direction of travel, said apron being so disposed as to receive the contents as they fall from the drums and assist in spreading them evenly over the land. This apron is secured to the underside of the main frame at its forward ends by means of the swinging links 19, and to the arms 5, by means of the flexible or chain connections 20. By this means of connection the apron is swingingly supported, so that the swinging action will be from front to rear and thus assist in the feeding of the lime and fertilizer or seed to the rear. The chains permit the rear end of the apron to be raised or lowered as may be desired.

From the foregoing description, it will be seen that I provide a very simple broadcast lime and fertilizer spreader and seed planter, in which the feed of the lime, fertilizer, compost and seed may be regulated to any quantity to the acre and is a forced feed, the ingredients upon the inside of the drums being thrown against the walls of the drum and forced out evenly through the regulated apertures. By this means of spreading lime, I accomplish an even spreading, which has heretofore not been possible by hand, and by means of my regulating devices the desired quantity from 100 to 3,000 lbs. may be applied to the acre with the same precision.

What I claim, as new, is:—

1. In a machine of this character, the combination with a frame U-shaped in plan and having its terminals extending rearwardly to form arms, an axle journaled in said arms intermediate of their ends, and wheels rotatable with the axle, of a drum mounted upon the axle, means to cause the drum to rotate with the axle or to be free therefrom, said drum being provided with a series of rows of apertures through which the contents are fed, and a spreading apron below the drum and having its forward ends hingedly depending from the forward portion of the frame and having its rear ends flexibly and adjustably depending from the ends of the arms.

2. In a machine of this character, the combination with a U-shaped frame having its terminals extending rearwardly to form parallel arms, an axle journaled in said arms intermediate of their ends, and wheels rotatable with said axle, of a drum mounted upon the axle and provided with a series of rows of apertures through which the contents of the drum are fed, means to cause the drum to rotate with the axle or to be free therefrom, and a spreading apron flexibly supported by the frame and its arms below the drum and having a series of parallel corrugations extending rearwardly from the front edge to the rear edge, whereby the contents from the drum fall upon the apron and are spread by the said corrugations.

3. In a machine of this character, the combination with a frame, an axle and wheels, of a drum mounted upon the axle, means to cause the drum to rotate with the axle or to be free therefrom, said drum being provided with a series of rows of apertures through which the contents are fed, another drum similar in construction mounted to the rear of the first drum, means transmitting rotation from the axle to said last mentioned drum, and a spreading apron swingingly and flexibly disposed below both drums and adapted to receive and commingle and spread the contents from both drums, said apron having a series of parallel corrugations extending from the front to the rear edge thereof.

4. In a machine of this character, the combination with a frame, an axle and wheels, of a drum mounted upon the axle, means to cause the drum to rotate with the axle or to be free therefrom, said drum being provided with a series of rows of apertures through which the contents are fed, another drum similar in construction to the first drum mounted to the rear of the first drum, means for transmitting rotation from the axle to said last mentioned drum, and an apron mounted below both drums so as to receive the contents from both drums and spread the contents upon the land, said apron having a series of parallel corrugations extending from its front edge to its rear edge.

In testimony whereof I affix my signature in presence of two witnesses.

THOMAS JOEL KING.

Witnesses:
C. W. WINN,
S. E. BROWN.